United States Patent
Otsuka

(10) Patent No.: US 12,326,358 B2
(45) Date of Patent: Jun. 10, 2025

(54) SOUND LEAKAGE SUPPRESSION APPARATUS

(71) Applicant: TSUNAGARU DESIGN Inc., Tokyo (JP)

(72) Inventor: Gorouemon Otsuka, Tokyo (JP)

(73) Assignee: TSUNAGARU DESIGN Inc., Tokyo (JP)

( * ) Notice: Subject to any disclaimer, the term of this patent is extended or adjusted under 35 U.S.C. 154(b) by 320 days.

(21) Appl. No.: 18/166,442

(22) Filed: Feb. 8, 2023

(65) Prior Publication Data

US 2023/0184582 A1 Jun. 15, 2023

Related U.S. Application Data

(63) Continuation of application No. PCT/JP2020/042931, filed on Nov. 18, 2020.

(30) Foreign Application Priority Data

Aug. 11, 2020 (JP) .................................. 2020-135628

(51) Int. Cl.
*G01H 3/08* (2006.01)
*G10K 15/00* (2006.01)
*H04R 29/00* (2006.01)

(52) U.S. Cl.
CPC .............. *G01H 3/08* (2013.01); *G10K 15/00* (2013.01); *H04R 29/004* (2013.01); *H04R 2430/03* (2013.01)

(58) Field of Classification Search
None
See application file for complete search history.

(56) References Cited

U.S. PATENT DOCUMENTS

| 10,708,701 B2* | 7/2020 | Skovenborg ......... H04R 29/002 |
| 2020/0213780 A1* | 7/2020 | Qi ........................... G10K 9/13 |
| 2021/0193162 A1* | 6/2021 | Hook ....................... G10L 17/00 |

FOREIGN PATENT DOCUMENTS

| CN | 103698403 A | 4/2014 |
| JP | H09325783 A | 12/1997 |
| JP | 2002131122 A | 5/2002 |

(Continued)

OTHER PUBLICATIONS

English Translation of International Search Report dated Feb. 16, 2021, mailed in counterpart International Application No. PCT/JP2020/042931, 3 pages.

*Primary Examiner* — Clayton E. LaBalle
*Assistant Examiner* — Diana Hancock
(74) *Attorney, Agent, or Firm* — Kim & Stewart LLP

(57) ABSTRACT

A sound leakage suppression apparatus for suppressing sound produced in a room from leaking outside thereof, includes a microphone, a display, and a processor configured to acquire information indicating sound insulation property of the room, based on the acquired information, determine a maximum volume level of sound that is permitted for each of a plurality of predetermined frequencies, control the microphone to collect sound produced in the room at a first time and determine a current volume level of the sound produced at the first time separately for each of the predetermined frequencies, and control the display to display both the maximum volume level and the current volume level for each of the predetermined frequencies.

20 Claims, 17 Drawing Sheets

(56) References Cited

FOREIGN PATENT DOCUMENTS

| JP | 2002243533 | A |   | 8/2002  |
|----|------------|---|---|---------|
| JP | 2008122852 | A |   | 5/2008  |
| JP | 2010181824 | A |   | 8/2010  |
| JP | 2014146158 | A |   | 8/2014  |
| JP | 6230207    | B1| * | 11/2017 |

* cited by examiner

FIG. 14

Table 1

| Basic sound insulation property Dr value | Wooden structure | Steel frame structure | Reinforced concrete structure | Stone or brick structure |
|---|---|---|---|---|
| Room in housing complex | Dr-40 | Dr-45 | Dr-50 | Dr-45 |
| Room in detached house | Dr-30 | Dr-35 | Dr-40 | Dr-35 |
| Room in office | Dr-35 | Dr-40 | Dr-45 | Dr-40 |
| Guest room in hotel | Dr-35 | Dr-40 | Dr-45 | Dr-40 |
| Room in hospital | Dr-35 | Dr-40 | Dr-45 | Dr-40 |
| Classroom in school | Dr-30 | Dr-35 | Dr-40 | Dr-35 |

FIG. 15

Table 2

| Dr value / frequency | 125 Hz | 250 Hz | 500 Hz | 1 kHz | 2 kHz | 4 kHz (dB) |
|---|---|---|---|---|---|---|
| Dr-110 | 95.0 | 102.5 | 110.0 | 115.0 | 120.0 | 120.0 |
| Dr-105 | 90.0 | 97.5 | 105.0 | 110.0 | 115.0 | 115.0 |
| Dr-100 | 85.0 | 92.5 | 100.0 | 105.0 | 110.0 | 110.0 |
| Dr-95 | 80.0 | 87.5 | 95.0 | 100.0 | 105.0 | 105.0 |
| Dr-90 | 75.0 | 82.5 | 90.0 | 95.0 | 100.0 | 100.0 |
| Dr-85 | 70.0 | 77.5 | 85.0 | 90.0 | 95.0 | 95.0 |
| Dr-80 | 65.0 | 72.5 | 80.0 | 85.0 | 90.0 | 90.0 |
| Dr-75 | 60.0 | 67.5 | 75.0 | 80.0 | 85.0 | 85.0 |
| Dr-70 | 55.0 | 62.5 | 70.0 | 75.0 | 80.0 | 80.0 |
| Dr-65 | 50.0 | 57.5 | 65.0 | 70.0 | 75.0 | 75.0 |
| Dr-60 | 45.0 | 52.5 | 60.0 | 65.0 | 70.0 | 70.0 |
| Dr-55 | 40.0 | 47.5 | 55.0 | 60.0 | 65.0 | 65.0 |
| Dr-50 | 35.0 | 42.5 | 50.0 | 55.0 | 60.0 | 60.0 |
| Dr-45 | 30.0 | 37.5 | 45.0 | 50.0 | 55.0 | 55.0 |
| Dr-40 | 25.0 | 32.5 | 40.0 | 45.0 | 50.0 | 50.0 |
| Dr-35 | 20.0 | 27.5 | 35.0 | 40.0 | 45.0 | 45.0 |
| Dr-30 | 15.0 | 22.5 | 30.0 | 35.0 | 40.0 | 40.0 |
| Dr-25 | 10.0 | 17.5 | 25.0 | 30.0 | 35.0 | 35.0 |
| Dr-20 | 5.0 | 12.5 | 20.0 | 25.0 | 30.0 | 30.0 |
| Dr-15 | 0.0 | 7.5 | 15.0 | 20.0 | 25.0 | 25.0 |
| Dr-10 | 0.0 | 2.5 | 10.0 | 15.0 | 20.0 | 20.0 |
| Dr-5 | 0.0 | 0.0 | 5.0 | 10.0 | 15.0 | 15.0 |
| Dr-0 | 0.0 | 0.0 | 0.0 | 5.0 | 10.0 | 10.0 |

FIG. 16

Table 3

| Building age | Correction value (dB) |
|---|---|
| Built less than 20 years ago | ±0 |
| Built more than 20 years ago and less than 40 years ago | -5 |
| Built more than 40 years ago | -10 |

FIG. 17

Table 4

| Item / Frequency | 125 Hz | 250 Hz | 500 Hz | 1 kHz | 2 kHz | 4 kHz |
|---|---|---|---|---|---|---|
| Sound insulation grade (Dr-50) | 35 | 42.5 | 50 | 55 | 60 | 60 |
| Correction value (-5) | -5 | -5 | -5 | -5 | -5 | -5 |
| Indoor ambient sound | 23 | 18 | 17 | 15 | 11 | 11 |
| Maximum sound pressure level | 53 | 55.5 | 62 | 65 | 66 | 66 |

Table 5

| Frequency band to be corrected | 125 Hz | 250 Hz | 500 Hz | 1 kHz | 2 kHz | 4 kHz | 8 kHz |
|---|---|---|---|---|---|---|---|
| Correction value | -16.1 | -8.6 | -3.2 | 0 | 1.2 | 1 | -1.1 |

(dB)
(1/1 octave band display)

SOUND LEAKAGE SUPPRESSION APPARATUS

CROSS-REFERENCE TO RELATED APPLICATION(S)

This application is a continuation of International Patent Application No. PCT/JP2020/042931 filed Nov. 18, 2020, the entire contents of which are incorporated herein by reference.

BACKGROUND OF THE INVENTION

Technical Field

Embodiments described herein relate generally to a sound leakage suppression apparatus.

Background Art

Conventionally, in a housing complex or the like, noise troubles occur between adjacent residents due to sound leakage to adjacent rooms or upper and lower floors. Since a resident causing the sound does not know specifically how loud the volume of the sound (such as the volume of the voice, the musical instrument, or the television, etc.) is, the resident is often unaware of the noise generated from his or her own room, which can easily lead to noise trouble.

As a technology related to this art, there is a conventional noise monitoring device that can be easily installed in an existing building and suppress the generation of noise by making the user aware of the noise.

However, such a conventional noise monitoring device can only visually notify the user with lights having specific colors or aurally notify the user with sounds carrying sound leakage warning information, when noise is generated, making it difficult to identify which noise source caused the sound leakage when there are multiple causes of noise (i.e., sound sources).

SUMMARY OF THE INVENTION

For example, when several band members are playing a band performance, and only specific low frequency sounds are leaking as the cause of noise, it is sufficient to adjust the amplifier to reduce the low frequency sounds of the electric bass without stopping the band performance itself. Also, for example, when a DVD video of a live music performance is played in a room, sound leakage may occur because there is too much low frequency sounds, which is more prone to sound leakage than high frequency sounds. In such a situation, sound leakage may not become a problem at all when the volume level of sounds in the low frequency range is lowered with an amplifier equalizer function, etc.

Embodiments of the present invention make it possible to capture the volume of sound that may cause sound leakage for each frequency.

In one embodiment, a sound leakage suppression apparatus for suppressing sound produced in a room from leaking outside thereof, includes a microphone, a display, and a processor configured to acquire information indicating sound insulation property of the room, based on the acquired information, determine a maximum volume level of sound that is permitted for each of a plurality of predetermined frequencies, control the microphone to collect sound produced in the room at a first time and determine a current volume level of the sound produced at the first time separately for each of the predetermined frequencies, and control the display to display both the maximum volume level and the current volume level for each of the predetermined frequencies.

In another embodiment, a non-transitory computer readable medium stores a program causing a computer to execute a method for suppressing sound produced in a room from leaking outside thereof. The method comprises acquiring information indicating sound insulation property of the room, based on the acquired information, determining a maximum volume level of sound that is permitted for each of a plurality of predetermined frequencies, collecting sound produced in the room at a first time and determining a current volume level of the sound produced at the first time separately for each of the predetermined frequencies, and displaying both the maximum volume level and the current volume level for each of the predetermined frequencies.

In yet another embodiment, a method carried out by a device for suppressing a sound produced in a room from leaking outside thereof, comprises acquiring information indicating sound insulation property of the room, based on the acquired information, determining a maximum volume level of sound that is permitted for each of a plurality of predetermined frequencies, collecting sound produced in the room at a first time and determining a current volume level of the sound produced at the first time separately for each of the predetermined frequencies, and displaying both the maximum volume level and the current volume level for each of the predetermined frequencies. According to the embodiments of the present invention, it is possible to grasp the sound volume that may cause sound leakage for each frequency.

BRIEF DESCRIPTION OF THE DRAWINGS

FIGS. 14-18 depict tables used for sound leakage suppression according to an embodiment.

DETAILED DESCRIPTION

Embodiments of the present invention will be described in detail with reference to the drawings.

<Sound Leakage Suppression Apparatus>

Figure 1:
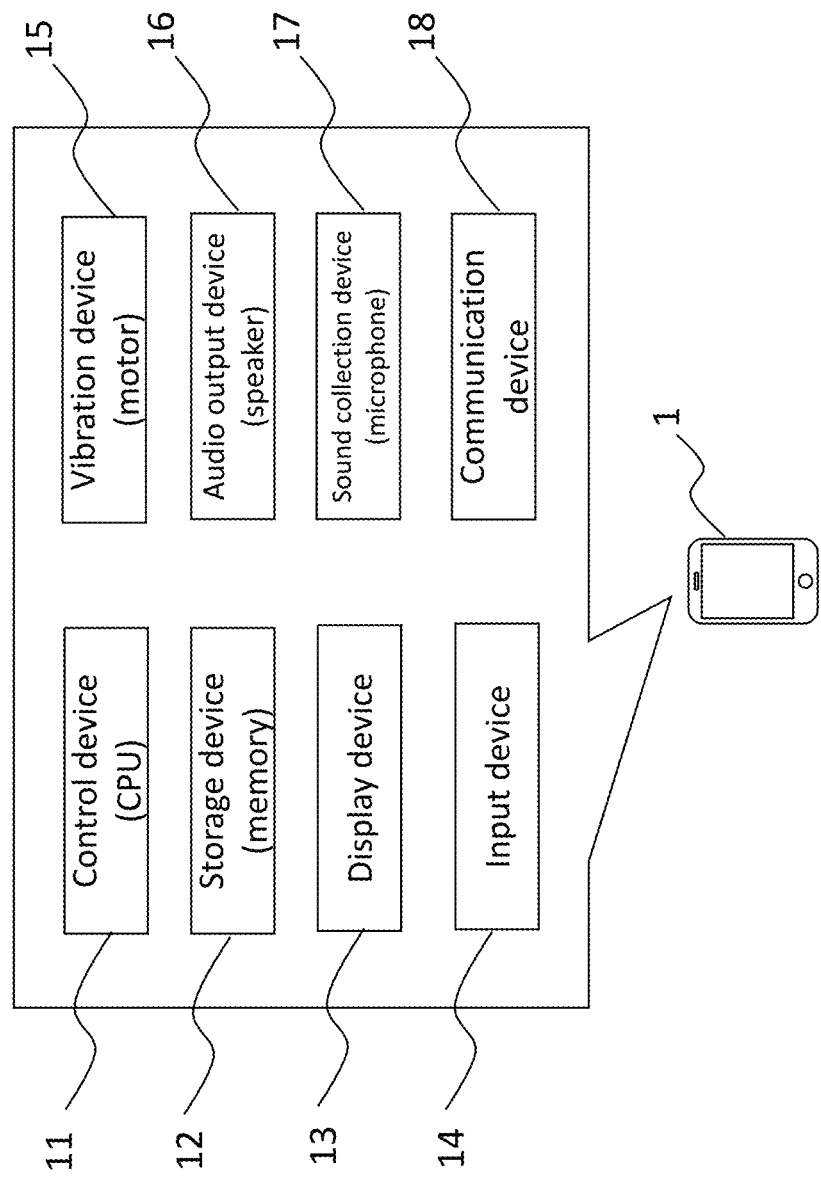
FIG. 1 shows an example of a hardware configuration of a sound leakage suppression apparatus according to an embodiment.

FIG. 1 shows an example of a hardware configuration of a sound leakage suppression apparatus 1 according to an embodiment. Specifically, the sound leakage suppression apparatus 1 according to the present embodiment includes a control device or a processor 11 such as a central processing unit (CPU), a storage device 12 such as a memory, a display device 13, an input device 14, a vibration device 15 such as a vibration motor, an audio output device 16 such as a speaker, a sound collection device 17 such as a microphone, and a communication device 18 such as a network interface circuit.

The control device 11 executes various programs and performs arithmetic processing. The storage device 12 stores various programs and data. The display device 13 is a color display such as a liquid crystal display (LCD) or the like. The input device 14 has one or more unique operation keys or buttons, and/or a touch panel capable of detecting tap coordinates on the display screen. The vibration device 15 generates vibration. The audio output device 16 outputs audio. The sound collection device 17 collects surrounding sound. The communication device 18 performs information communication with other devices by wired communication via a cable or wireless communication such as Wi-Fi (registered trademark) or Bluetooth (registered trademark).

The sound leakage suppression apparatus 1 visualizes the upper volume limit at which sound leakage (i.e., noise) such as sound or voice occurs to an adjacent room on the display screen for each frequency based on the sound insulation property in the building room, and easily visualizes whether or not the real-time sound pressure or volume level measured in the building room exceeds the upper volume limit of the sound leakage at each frequency. In addition, when the measured sound pressure level exceeds the upper volume limit of the sound leakage in any of the frequency bands, the sound leakage suppression apparatus 1 notifies the user by an alert or the like that there is a high possibility of sound leakage occurring the outside of the room.

The sound leakage suppression apparatus 1 is, for example, a mobile terminal carried by a user and in which a sound leakage suppression application program is installed in advance. This will be described in detail below.

<Application Initial Setup Example>

Next, an initial setup example of the sound leakage suppression application program (hereinafter simply referred to as the application) installed in the sound leakage suppression apparatus 1 according to an embodiment will be specifically described.

Figure 2:
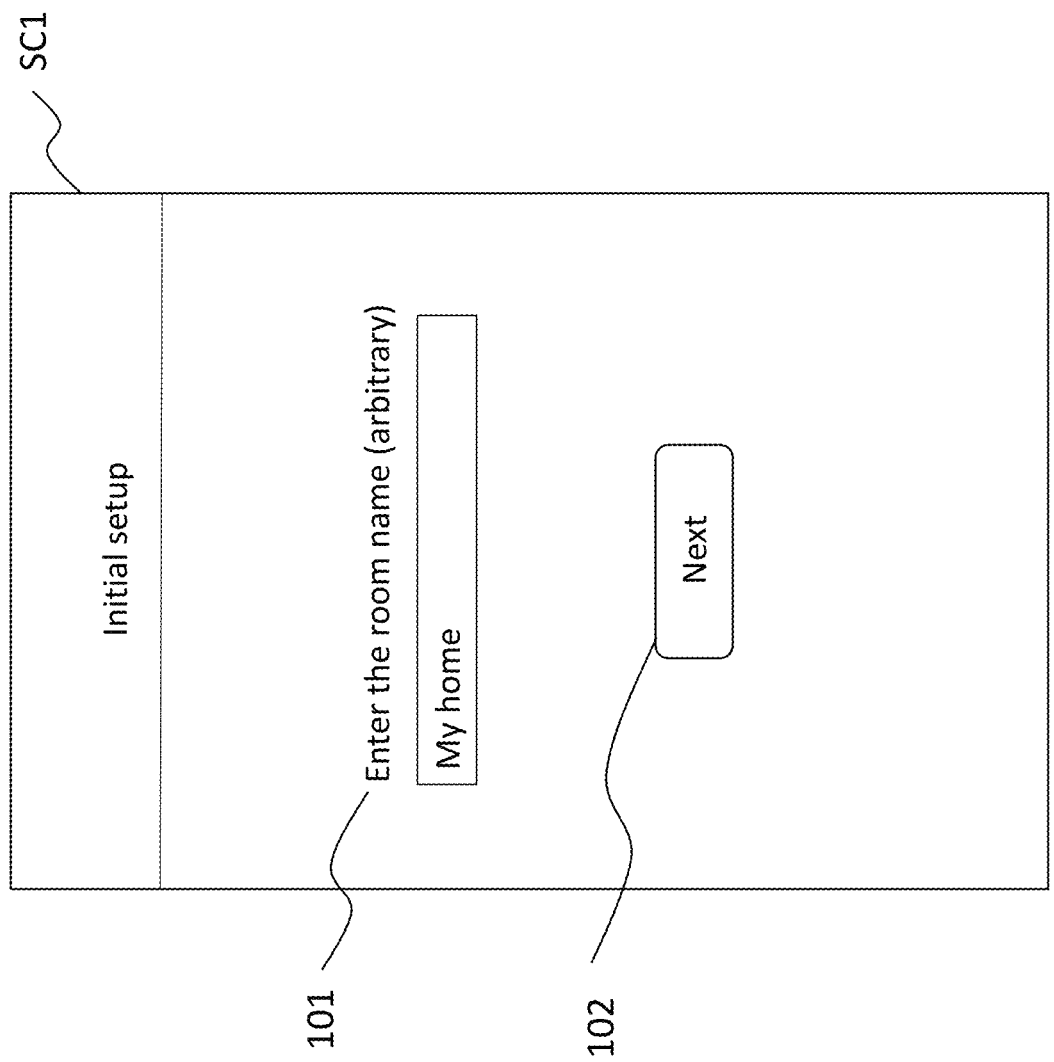
FIGS. 2-8 show examples of application screens displayed by the sound leakage suppression apparatus according to an embodiment.

FIG. 2 shows an application screen SC1 displayed by the sound leakage suppression apparatus 1 according to an embodiment. When using the application for the first time, the user performs an initial setup after activating the application. Specifically, first, the user registers an arbitrary name of the room for which sound-leakage-suppression is to be performed in the field 101 from the application screen SC1 displayed on the display device 13 via the input device 14, and presses the "Next" button 102.

Figure 3:
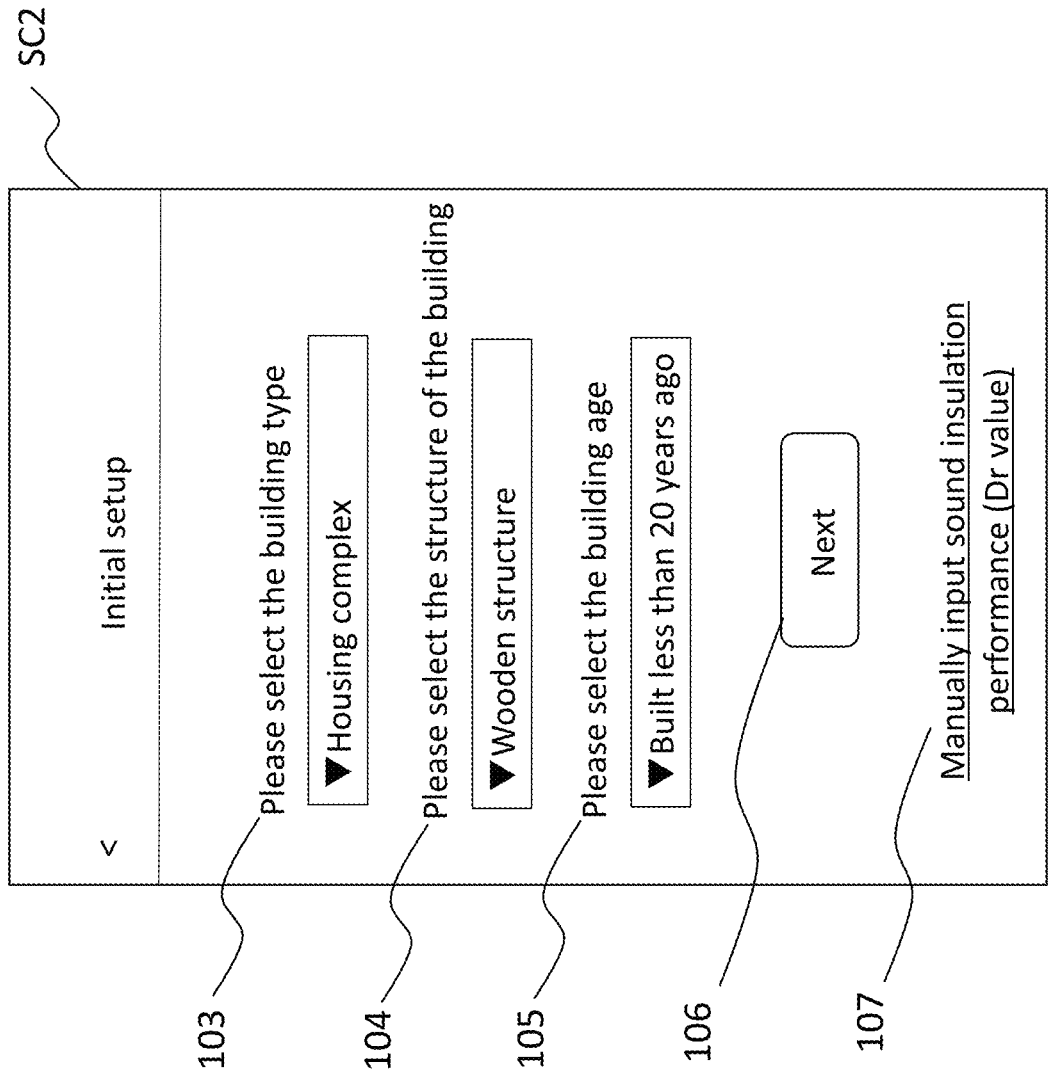

FIG. 3 shows an application screen SC2 displayed by the sound leakage suppression apparatus 1 according to an embodiment. Next, in order to determine the sound insulation grade Dr-value, through the drop-down menu 103, the user selects one applicable building type from, for example, the following predetermined options:

Housing complex
Office
Hotel
Hospital
School
House

Figure 13:
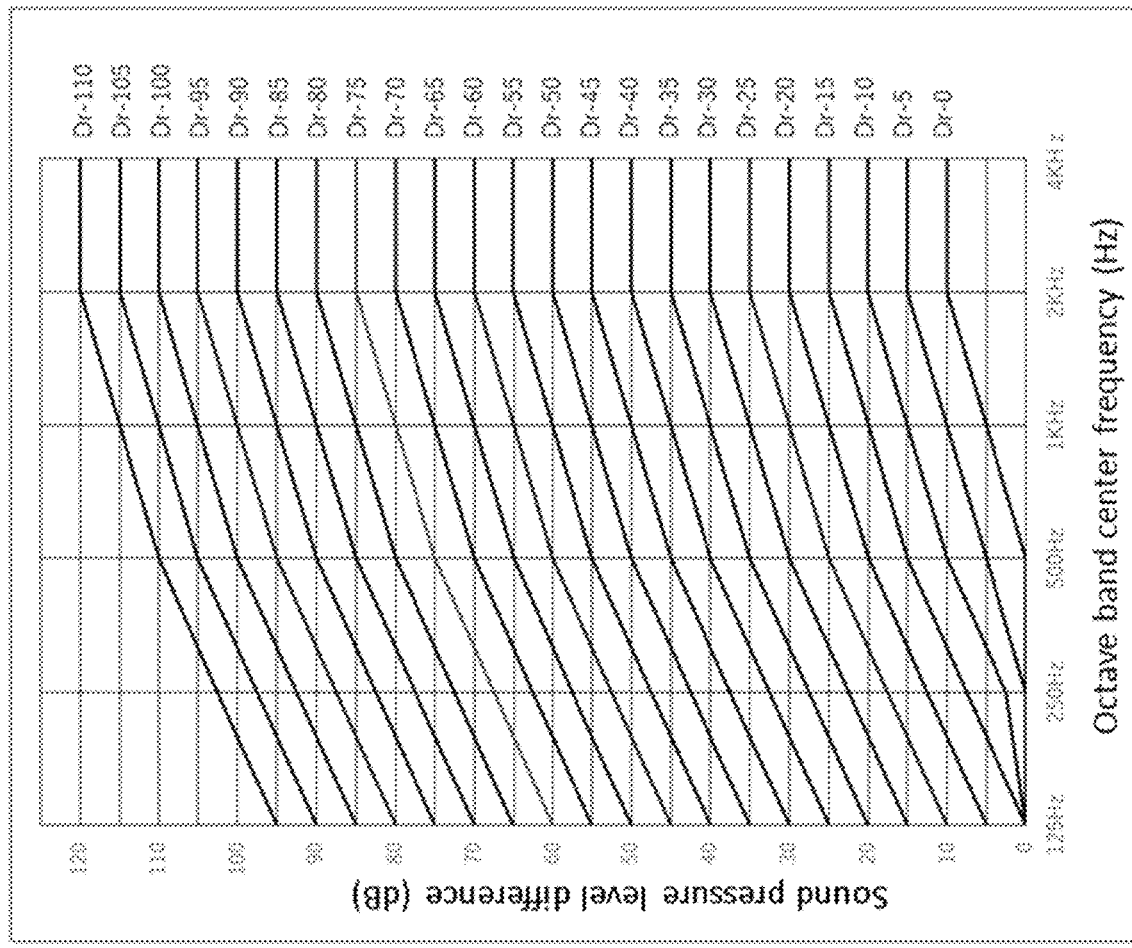
FIG. 13 depicts a sound insulation grade curve according to an embodiment.

Subsequently, through the drop-down menu 104, the user selects one corresponding building type, for example, from among the following predetermined options:

Wooden structure
Steel frame structure
Reinforced concrete structure
Stone or brick structure Here, the sound insulation grade Dr-value will be described. The sound insulation grade Dr-value is an indicator for grading and evaluating the sound insulation property (e.g., spatial sound pressure level difference) of the door boundary wall and the floor of the building. In an embodiment, the indicator, A1419 "Method for evaluating sound insulation property of buildings and building members", specified by JIS (Japanese Industrial Standards) is used among several main indicators. The grading defines the sound insulation grade curve (FIG. 13) and the value of 500 Hz in each reference curve is called by the name of that reference curve. The notation method of the Dr-value is denoted as "Dr-##" in JIS. For example, "Dr-50" is a reference line at which the value of 500 Hz becomes 50 dB. The larger the Dr-value, the better the sound insulation property.

In an embodiment, first, referring to Table 1 (see FIG. 14), which is a sound insulation grade table by building use/structure, the Dr-value corresponding to the combination of the building type and structure selected by the user is determined.

Next, referring to Table 2 (see FIG. 15), which is a sound pressure level difference table in the Dr-value, the sound insulation property (unit: dB) for each frequency corresponding to the Dr-value determined using Table 1 is determined.

For example, in the case where the building type is a housing complex and the structure is a reinforced concrete structure, according to Table 1, the sound insulation value for each frequency is Dr-50. According to Table 2, the sound insulation property (value) for each frequency of Dr-50 is 35 dB at 125 Hz, 42.5 dB at 250 Hz, 50 dB at 500 Hz, 55 dB at 1 kHz, 60 dB at 2 kHz, and 60 dB at 4 kHz. Each decibel value as the sound insulation property for each frequency of Dr-50 indicates the upper limit value (hereinafter also referred to as the maximum estimated sound pressure level) of the sound pressure level for each frequency estimated not to leak sound to the outside of the room.

When the Dr-value indicating the sound insulation property is known, the user can directly input or selectively input a specific Dr-value in the range of 0 to 110 by selecting the item 107 instead of the drop-down menus 103 and 104.

Next, in order to determine the correction value for the sound insulation property of the Dr-value, through the drop-down menu 105, for example, the user selects the corresponding building age from predetermined options shown below, and presses the "Next" button 106.

Built less than 20 years ago
Built more than 20 years ago and less than 40 years ago
Built more than 40 years ago In general, it is known that the sound insulation property of the building is significantly inferior as the building age increases. In the correction based on the building age, the sound insulation property of the Dr-value is corrected according to the building age as shown in Table 3 (see FIG. 16) in consideration of the aging degradation of the building and the construction method in the past.

Through the drop-down menu 105, the user may select not only the building age but also the building date. In this case, a decrease in sound insulation property for a building built between 1980 and 1997 when sound insulation rating was not widespread (e.g., 1980 to 1997) is about −5 dB, and a decrease in sound insulation property for a building built before 1979 is about −10 dB. Those values can be used to correct the numerical value of the sound insulation property.

Figure 4:
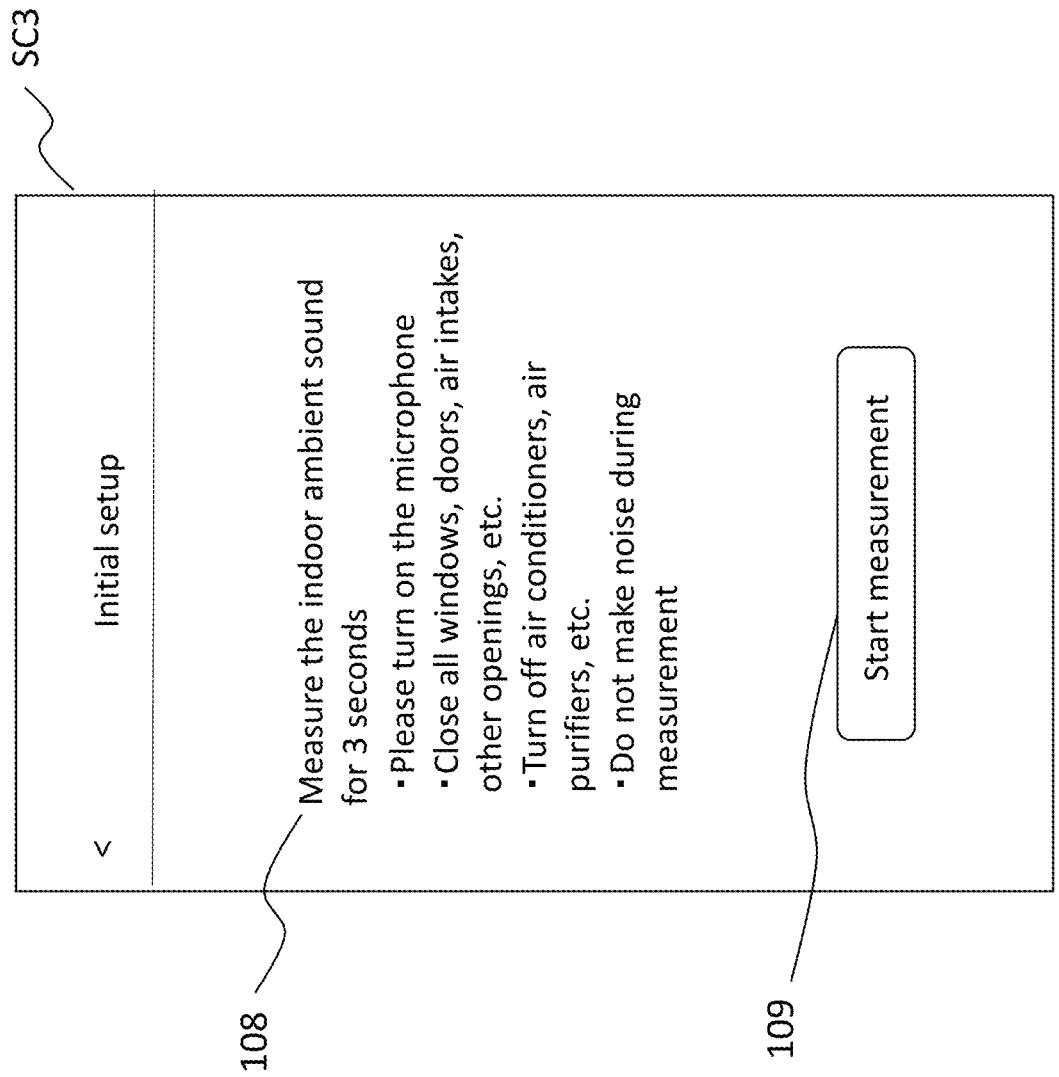

FIG. 4 shows an application screen SC3 displayed by the sound leakage suppression apparatus 1 according to an embodiment. Next, in order to use the sound pressure level of the indoor ambient sound (also referred to as background noise) as the masking correction value for each frequency, the text 108 indicates that the indoor ambient sound is to be measured and precautions are to be taken for the measurement. When ready to start the measurement, the user presses the "Start measurement" button 109.

Figure 5:
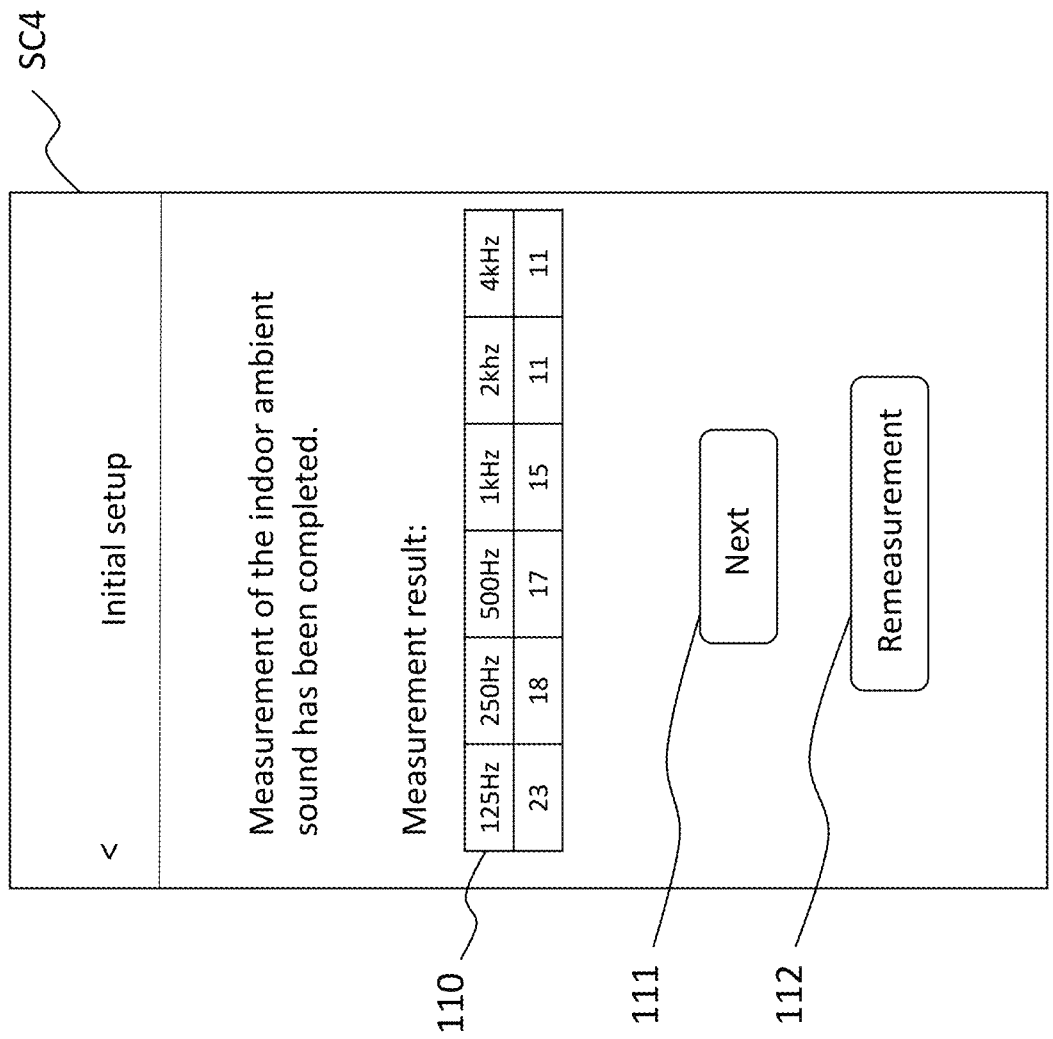

FIG. 5 shows an application screen SC4 displayed by the sound leakage suppression apparatus 1 according to an embodiment. On the basis of the sound collected via the sound collection device 17, an average value for each frequency band of the indoor ambient sound measured for three seconds, for example, is shown in the table 110 as the measurement result. Then, the user presses the "next" button 111. Further, the user can remeasure the indoor ambient sound by pressing the "Remeasurement" button 112.

Here, the reason for measuring the indoor ambient sound is that even in a room that sounds quiet, very small noise is always generated unless it is an anechoic room, and the sound leakage from other rooms is masked by the ambient sound (i.e., noise) and becomes difficult to be heard due to the influence of the room's outdoor environment, the air conditioner, etc. For example, in a building with window sashes, air intakes, etc., which have the low sound insulation property, the indoor ambient sound increases, and in a building along a main road and a highway, the indoor ambient sound also increases. In addition, the indoor ambient sound also changes according to changes in external factors such as crowds and traffic between the daytime and the midnight. In this application, in view of the difficulty in hearing sound leakage from the other rooms in the building with many external noises due to the location of the building or the like, the upper limit value of the sound pressure level that does not cause sound leakage is added by the sound pressure level of the measured indoor ambient sound so as to reflect the effect on the sound leakage due to the external environment.

Figure 6:
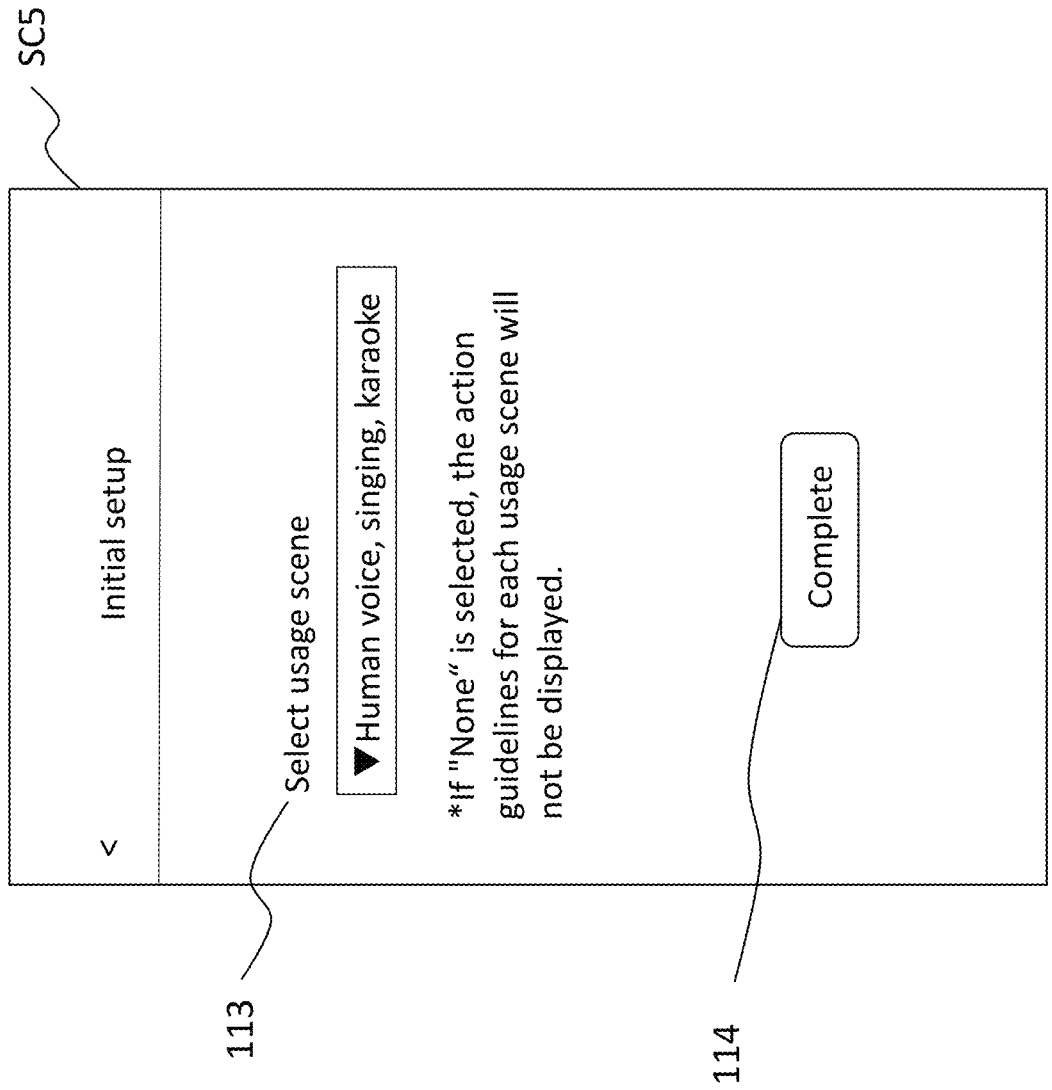

FIG. 6 shows an application screen SC5 displayed by the sound leakage suppression apparatus 1 according to an embodiment. Next, as information for specifying the cause of the sound leakage from the room to the outside of the room, in the drop-down menu 113, the user selects one corresponding usage scene from predetermined options shown below, for example, and presses the "complete" button 114.

Figure 7:
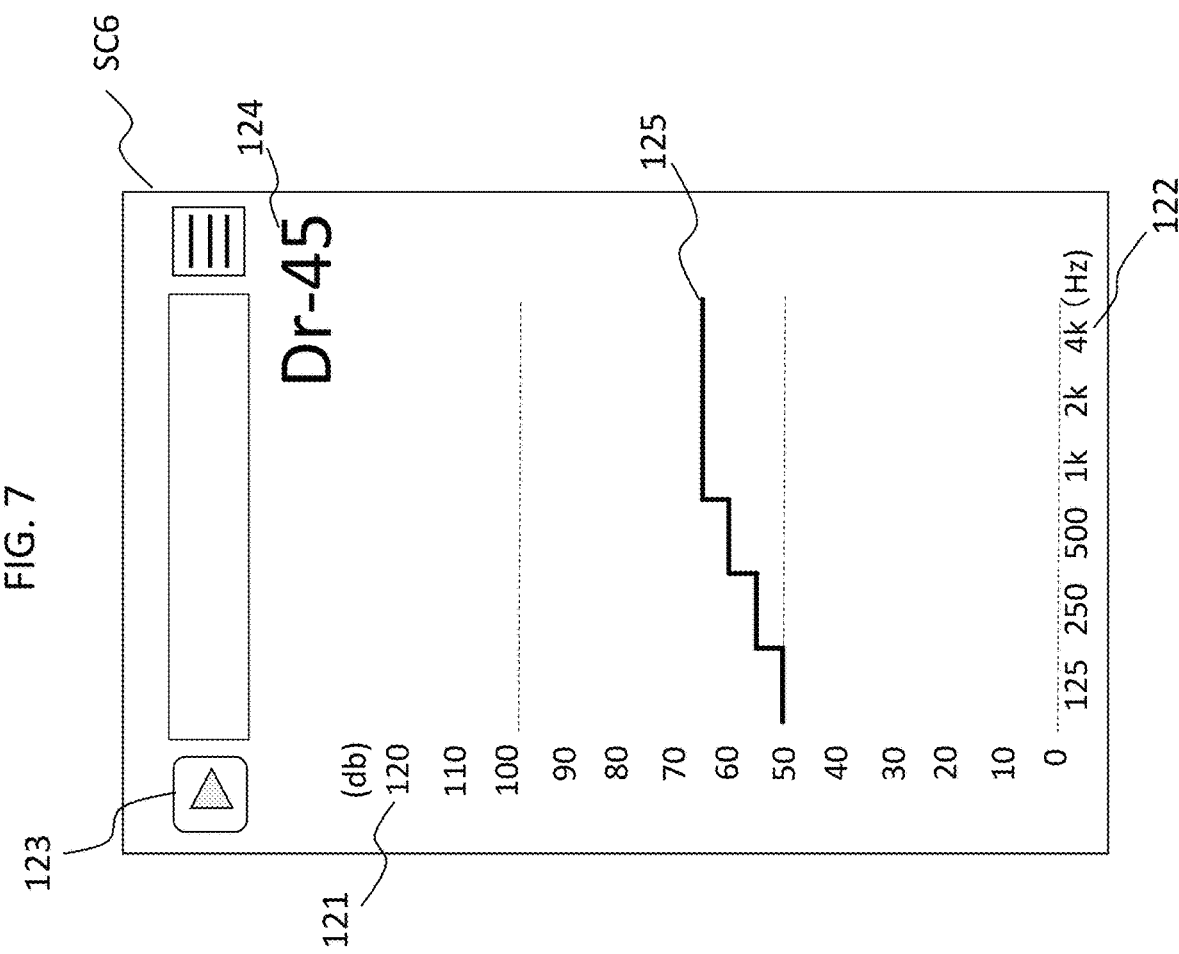

Human voice, singing, karaoke
Watching TV, listening to audio
Playing instruments (without volume control)
Playing instruments (with volume control)
Simultaneous performance of singing with an instrument, band performance, etc.
Cleaning with a vacuum cleaner
Others
None FIG. 7 shows an application screen SC6 displayed by the sound leakage suppression apparatus 1 according to an embodiment. For example, the application screen SC6 is displayed after the initial setup is completed.

As shown in FIG. 7, on the application screen SC6 after the initial setup is completed, the scale 121 indicating the sound pressure level (sound level) is displayed on the vertical axis, and the scale 122 indicating the frequency band on the horizontal axis. The scale unit of the sound pressure level is dB representing the loudness of the sound, and the scale unit for the frequency band is Hz representing the frequency of the sound.

The measurement start button 123 is an operation button for starting measurement of the real-time sound pressure level (also referred to as the noise level). When the measurement start button 123 is pressed by the user, the indoor sound is collected via the sound collection device 17, and the measurement of the sound pressure level in the room is started.

The sound insulation grade display 124 is the Dr-value after correction according to the building age based on the sound insulation grade Dr-value determined in the initial setup.

The alert threshold value 125 is set based on the initial setup, and indicates the upper limit value of the sound pressure level for each frequency estimated to suppress sound leakage to the outside of the building room, that is, the maximum estimated sound pressure level for each frequency that does not leak sound. The alert threshold value 125 is used as a threshold for determining that sound leakage has occurred when the sound pressure level for each frequency measured in real time in the room exceeds the alert threshold.

For example, in the initial setup, when the building type is "housing complex" and structure is "reinforced concrete structure" as the selected input value, the sound insulation grade is Dr-50 according to Table 1 above, the sound insulation property values by frequency of Dr-50 according to Table 2 are 35 dB at 125 Hz, 42.5 dB at 250 Hz, 50 dB at 500 Hz, 55 dB at 1 kHz, 60 dB at 2 kHz and 60 dB at 4 kHz. Also, when the building age is "Built more than 20 years ago but less than 40 years ago", 5 dB is subtracted from the sound insulation property value of each frequency. This correction is equivalent to the correction to lower the sound insulation rating by one grade, that is, the correction from Fr-50 to Dr-45, which is shown in FIG. 7.

Then, when the measured indoor ambient sound is, for example, 23 dB, 18 dB, 17 dB, 15 dB, 11 dB and 11 dB for the respective frequencies of 125 Hz, 250 Hz, 500 Hz, 1 kHz, 2 kHz and 4 kHz, each is added to the numerical value of sound insulation property for each frequency.

As a result, as shown in Table 4 (see FIG. 17), for example, the upper limit value of the sound pressure level for each frequency that is estimated not to leak sound is calculated as 53 dB, 55.5 dB, 62 dB, 65 dB, 66 dB and 66 dB for the respective frequencies of 125 Hz, 250 Hz, 500 Hz, 1 kHz, 2 kHz and 4 kHz. Since the upper limit values of these sound pressure levels calculated for each frequency are the maximum estimated sound pressure level that does not leak sound in the room, they can be displayed as the alert threshold value 125 respectively for each frequency.

<Example of Application Use>

Next, an example of the use of the sound leakage suppression application program executed by the sound leakage suppression apparatus 1 will be specifically described.

Figure 8:
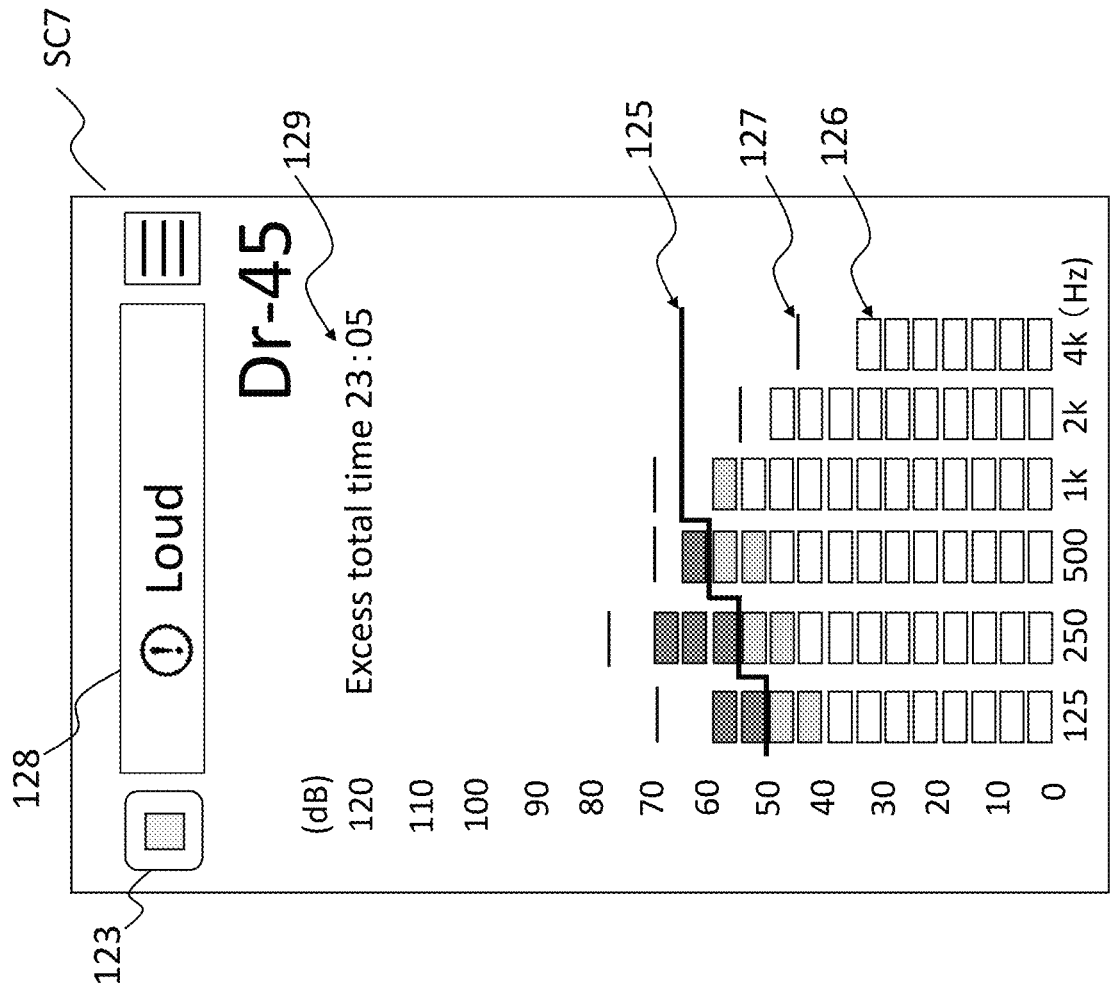

FIG. 8 shows an application screen SC7 displayed by the sound leakage suppression apparatus 1 according to an embodiment. After the initial setup, for example, when the measurement start button 123 is pressed by the user on the application screen SC6 shown in FIG. 7, the measurement of the sound pressure level in the room is started via the sound collection device 17, and the sound pressure level 126 for each frequency measured in real time is displayed as shown in FIG.8.

The real-time sound pressure level 126 is displayed for each frequency by a predetermined indicator with respect to the vertical axis direction. For example, a rectangular block as an indicator component as shown in FIG. 8 can be displayed as a sound pressure level of 5 dB per block. When the real-time sound pressure level is displayed by such an indicator, for example, fractions less than 5 dB can be rounded off.

Also, the color of the rectangular block color is based on the real-time sound pressure level with respect to the alert threshold value 125. For example, when the real-time sound pressure level is 10 dB or more lower than the alert threshold value 125, the display color of the rectangular block is blue indicating that the sound leakage is likely low. When the real-time sound pressure level is less than 10 dB lower than the alert threshold value 125 and does not exceed the alert threshold value 125, the display color of the rectangular block is yellow indicating that there is a possibility of sound leakage. When the real-time sound pressure level exceeds the alert threshold value 125, the display color of the rectangular block is red indicating that there is a high possibility of sound leakage. This allows the user to intuitively visualize the real-time sound pressure level. In particular, when the rectangular block color is red, the user can intuitively recognize that the real-time sound pressure level exceeds the alert threshold value 125, that is, there is a high possibility that sound leakage has occurred in the room.

The MAX display 127 indicates the maximum sound pressure level measured among the real-time sound pressure levels. The MAX display 127 may be displayed only when the real-time sound pressure level has exceeded the alert threshold value 125.

When the real-time sound pressure level exceeds the alert threshold value 125, the alert display 128 indicates that there is a high possibility of sound leakage to the surrounding rooms and/or an alert or warning such as, for example, "Loud", "The sound is loud", and "High possibility of sound leakage". At the same time, vibration may be generated by the vibration device 15.

Also, when the usage scene is set in the initial setup described above, the alert display 128 displays user action guidelines indicating what specific actions the user should take under the set usage scene to suppress sound leakage. Specifically, the following action guidelines can be displayed according to the set usage scene:

Reduce the volume of voice by X % (set usage scene: Human voice, singing, karaoke)

Lower the volume by X % (set usage scene: Watching TV, Listening audio)

Stop playing (set usage scene: Playing instruments (without volume control))

Lower the volume of excess frequency (set usage scene: Playing instruments (with volume control))

Turn down excess musical instrument sound (set usage scene: Simultaneous performance of singing with an instrument, band performance, etc.)

Switch to weaker operation (set usage scene: Cleaning with a vacuum cleaner)

Lower the volume of excess frequency (set usage scene: Others)

The X % of the voice volume and sound volume that should be suppressed in the action guideline can be calculated by calculating the rate at which the real-time sound pressure level falls below the alert threshold value 125 for the current real-time sound pressure level. Also, the excess frequency that should be suppressed may indicate the specific frequency beyond the alert threshold value 125 from among the current real-time sound pressure levels, displaying, for example, "Lower the volume of excess frequency 125 Hz".

By displaying the user action guideline, the user can easily know what is specifically needed to suppress sound leakage, such as how much the volume should be reduced, what percent the TV volume should be lowered, or which frequency of sound should be suppressed.

When the real-time pressure level exceeds the alert threshold value 125, the excess total time display 129 displays the total time of the duration of the excess time. The adverse physical and mental effects of sound leakage on neighbors and others is completely different in case of temporary sound leakage and in case of cumulative sound leakage over a long period of time. Therefore, by simply grasping the total time of sound leakage, the user can consider or minimize the adverse effects on neighbors and others. For example, when the user has to use a vacuum cleaner in a room with poor sound insulation, such as an old wooden apartment, even if sound leakage itself cannot be completely suppressed, the user can be aware that sound leakage is occurring and try to finish the cleaning in the shortest possible time, referring to the displayed excess total time and sound leakage. As a result, the user can reduce the adverse mental and physical effects on neighbors and others.

As described above, the sound leakage suppression apparatus 1 estimates the sound insulation property in the building room from the input building type, the structure, and the building age, and visualizes the upper volume limit (alert threshold) at which sound leakage may occur in the surrounding rooms on the display screen for each frequency. As a result, the user can intuitively grasp how much sound leakage may occur in surrounding rooms for each frequency in accordance with the difference in the sound insulation property depending on the building and the sound insulation property in the building room.

In addition, the sound leakage suppression apparatus 1 easily visualizes whether or not the real-time sound pressure level measured in the room exceeds the upper volume limit for each frequency by using, for example, an indicator with color, etc. Thus, the user can intuitively understand whether or not sound leakage may be occurring in the surrounding room at that moment for each frequency.

Therefore, when there is a possibility that sound leakage has occurred, the user can know the frequency band causing the sound leakage. It means the user can easily specify which specific sound source is the cause of the sound leakage, and can reduce the sound pressure level of the frequency band to suppress the occurrence of sound leakage to the outside of the room.

In addition, when the real-time sound pressure level exceeds the upper volume limit for each frequency, the display screen notifies the user of an alert, warning or the user action guideline indicating that further sound leakage is likely to be occurring. This allows the user to intuitively grasp the possibility that sound leakage is currently occurring in the surrounding room. Furthermore, by being displayed of the user action guideline, the user can easily grasp a specific solution to the sound leakage that is likely to be occurring at the moment, depending on the usage scene.

<Software Configuration>

Figure 9:
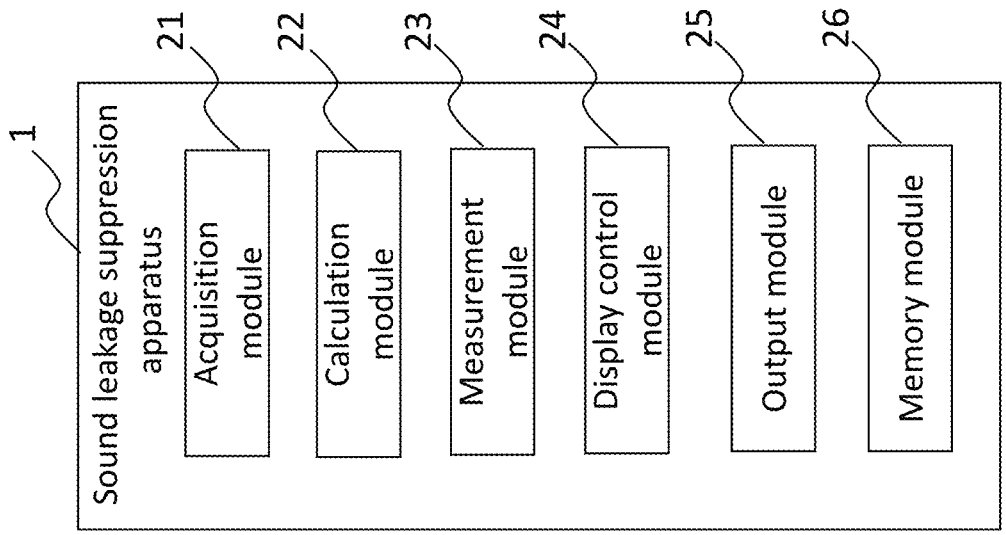
FIG. 9 shows an example of a software configuration of a sound leakage suppression apparatus according to an embodiment.

FIG. 9 shows an example of a software configuration of the sound leakage suppression apparatus 1. The sound leakage suppression apparatus 1 includes an acquisition module 21, a calculation module 22, a measurement module 23, a display control module 24, an output module 25, and a memory module 26.

The acquisition module 21 has a function of acquiring information (e.g., the sound insulation grade, the building age, etc.) on the sound insulation property in the building room and information (e.g., action scene or the like) on the cause of sound leakage input by the user.

The calculation module 22 has a function of calculating, for each frequency, the maximum estimated sound pressure level at which indoor sound does not leak, based on the sound insulation property information and the indoor ambient sound.

The measurement module 23 has a function of controlling the sound collection device 17 to measure the indoor sound pressure level and the indoor ambient sound for each frequency.

The display control module 24 has a function of controlling the display device 13 to display the indoor sound pressure level and the maximum estimated sound pressure level for each frequency.

The output module 25 has a function of controlling the display device 13 and/or the vibration device 15 to output an alert indicating the occurrence of sound leakage from the room when the sound pressure level of at least any of the plurality of frequency exceeds the maximum estimated sound pressure level.

The memory module 26 stores in the storage device 13 reference information for calculating the maximum estimated sound pressure level that does not leak from the room, e.g., Tables 1-3 and 5.

Each functional module is executed by the control device 11 according to a sound leakage suppression application program. These modules may be implemented and executed by one or more circuits. Further, the sound leakage suppression application program may be stored in a computer readable medium.

<Application Initial Setup Process>

Figure 10:
FIG. 10 is a flowchart showing a process of application initial setup according to an embodiment.

FIG. 10 is a flowchart showing a process of the application initial setup according to an embodiment. Each step (hereinafter referred to as "S") can be executed by the control device 11 of the sound leakage suppression apparatus 1.

S1: The acquisition module 21 acquires information on the building type, the structure, and the building age that are selected by the user.

S2: The calculation module 22 refers to Table 1 above, which is stored by the memory module 26 in advance, and determines the sound insulation grade Dr-value in the building room based on the building type and the structure acquired in S1.

S3: The calculation module 22 refers to Table 2 above, which is stored by the memory module 26 in advance, and determines the sound insulation property value for each frequency according to the sound insulation grade Dr-value determined in S2.

S4: The calculation module 22 refers to Table 3 above, which is stored by the memory module 26 in advance, and corrects the sound insulation property value for each frequency determined in S3 based on the building age acquired in S1. Specifically, the calculation module 22 subtracts the correction value corresponding to the building age determined in Table 3 from the sound insulation property value for each frequency.

S5: The memory module 26 stores the sound insulation property value, which has been corrected in S4, for each frequency (referred to as a first sound insulation property value for each frequency) in the storage device 12.

S6: Next, the measurement module 23 controls the sound collection device 17 to measure the indoor ambient sound for each frequency in response to the user's operation of starting the measurement of the indoor ambient sound.

S7: The calculation module 22 corrects the first sound insulation property value for each frequency stored in S5 based on the indoor ambient sound for each frequency calculated in S6. Specifically, the calculation module 22 adds the measured indoor ambient sound for each frequency to the first sound insulation property value for each frequency.

S8: The memory module 26 stores the sound insulation property value, which has been corrected in S7, for each frequency (referred to as a second sound insulation property value for each frequency) in the storage device 12.

S9: The display control module 24 reads the second sound insulation property value, which is stored in the memory device 12 in S8, for each frequency. Also, the display control module 24 controls the display device 13 to display the application screen SC6 (see FIG. 7) in which the read second sound insulation property value for each frequency is set as the alert threshold. In this application, the second sound insulation property value for each frequency set as the alert threshold value is the maximum estimated sound pressure level that does not leak sound for each frequency.

<Application Usage Process>

Figure 11:
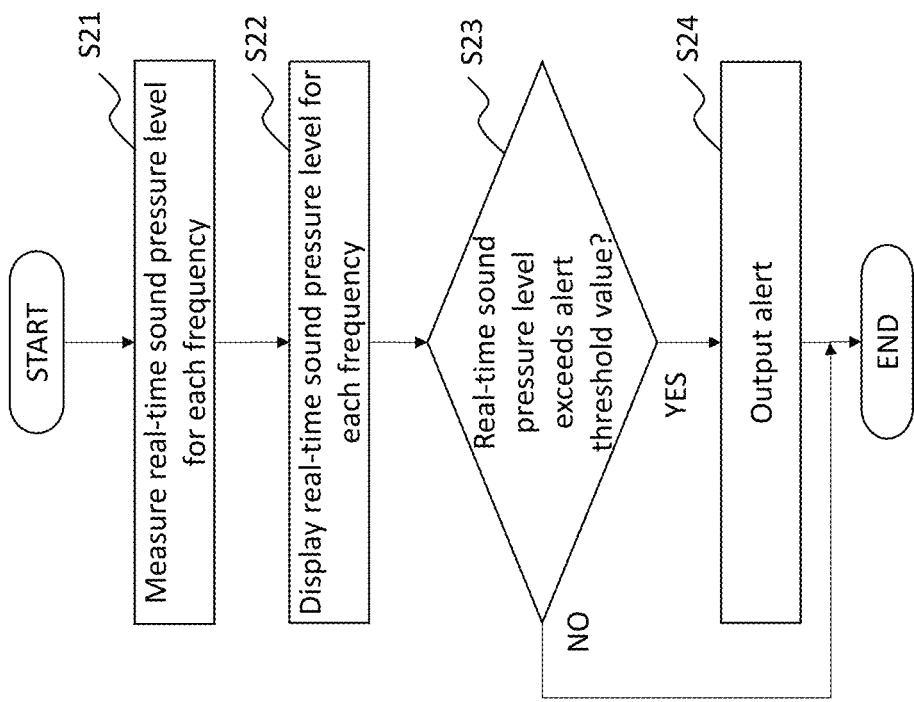
FIG. 11 is a flowchart showing an application usage process according to an embodiment.

FIG. 11 is a flowchart of an application usage process according to an embodiment.

S21: The measurement module 23 controls the sound collection device 17 to measure the real-time sound pressure level in the room for each frequency.

S22: The display control module 24 controls the display device 13 to display the real-time sound pressure levels measured in S21 for each frequency. The real-time sound pressure level can be measured and displayed every 500 milliseconds, for example.

S23: The output module 25 determines whether or not the real-time sound pressure level of at least any of the plurality of frequency exceeds the alert threshold.

S24: The output module 25 outputs an alert indicating the occurrence of sound leakage from the room when it is determined that the real-time sound pressure level exceeds the alert threshold in S23. As described above, outputting the alert here includes displaying on the display device 13 an alert or warning indicating that there is a high possibility of sound leakage to the surrounding rooms, e.g., "Loud", "The sound is loud", and "High possibility of sound leakage". Also, outputting the alert here includes generating vibration by the vibration device 15 and/or displaying on the display device 13 a user guideline of how to prevent or suppress the sound leakage.

Figure 12:
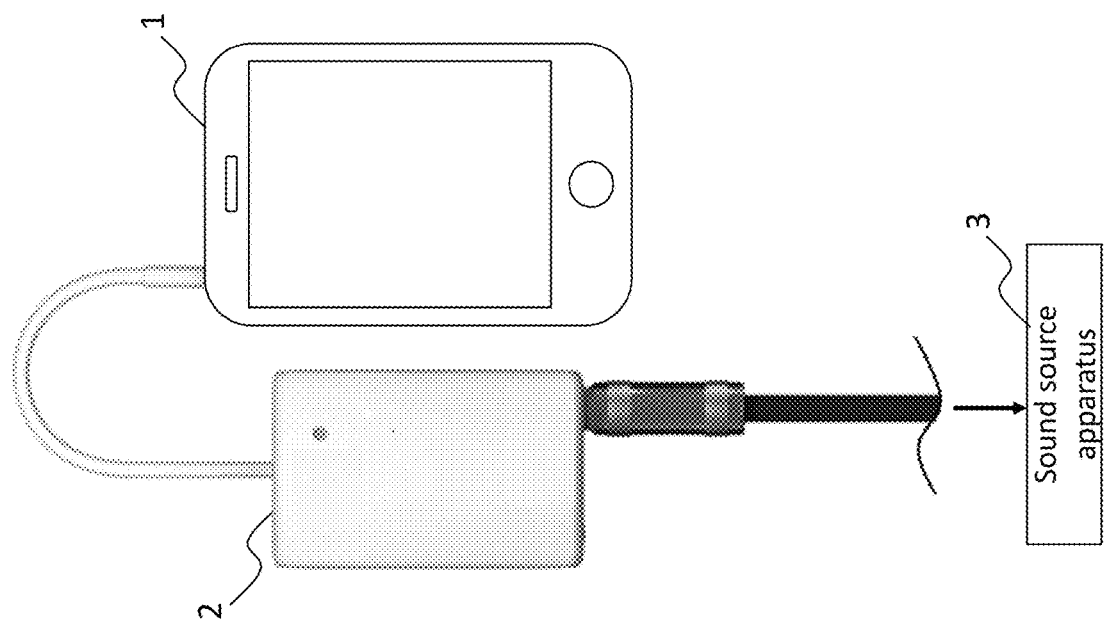
FIG. 12 shows an example of a connection configuration between the sound leakage suppression apparatus and a sound source device according to an embodiment.

FIG. 12 shows a connection configuration between the sound leakage suppression apparatus 1 and a sound source apparatus 3 according to an embodiment. The sound leakage suppression apparatus 1 according to the present embodiment is provided with an automatic volume adjustment function that automatically suppresses sound leakage when the user is playing musical instruments, playing karaoke, or listening to audio.

Specifically, the sound source apparatus 3 such as a microphone, a musical instrument, or an audio amplifier is connected to the sound leakage suppression apparatus 1 via a relay apparatus 2. When the real-time sound pressure level generated from the sound source apparatus 3 exceeds an alert threshold, the sound leakage suppression apparatus 1 sends a volume control change signal to the sound source apparatus 3 so as to automatically adjust the sound pressure level of the sound source apparatus 3 to a level where the MAX value of the real-time sound pressure level does not exceed the alert threshold (for example, lowing the instrument performance volume or lowing the volume).

Also, when the real-time sound pressure level of at least any of the plurality of frequency bands exceeds the alert threshold, the sound leakage suppression apparatus 1 transmits a volume change control signal containing information on the frequency band exceeding the alert threshold to the sound source apparatus 3 so as to automatically adjust the sound pressure level of the sound source apparatus 3 to a level at which the MAX value of real-time sound pressure level in the frequency band exceeding the alert threshold does not exceed the alert threshold (for example, lowering the low frequency range sound pressure level of the amplifier).

As a result, the sound leakage suppression apparatus 1 can automatically suppress sound leakage from the sound source apparatus 3 when the user is playing a musical instrument, playing karaoke, or listening to audio using the sound source apparatus 3.

The frequency displayed on the application screens described above is based on the 1/1 octave band showing six levels of frequency: 125 Hz, 250 Hz, 500 Hz, 1 kHZ, 2 kHz, and 4 kHz, because JIS (Japanese Industrial Standards) and the Architectural Institute of Japan determine the sound insulation grade in six stages. However, in view of the fact that ISO, International Organization for Standardization, determines the sound insulation class in 16 steps from 100 to 3.13 kHz, the frequency displayed on the application screen can be based on the ⅓ octave band showing 16 levels of frequency: 100 Hz, 125 Hz, 160 Hz, 200 Hz, 250 Hz, 315 Hz, 400 Hz, 500 Hz, 630 Hz, 800 Hz, 1 kHz, 1.25 kHz, 1.6 kHz, 2 kHz, 2.5 kHz, and 3.15 kHz. In this case, for example, the sound pressure level difference table at the Dr-value in Table 2 is prepared based on the ⅓ octave band.

The measurement time of the indoor ambient sound with the sound collection device 17 should be set to 3 seconds (JIS standard).

Since the human ear has different sensitives depending on the frequency, the loudness of the sound pressure level and the loudness of the noise perceived by humans are not necessarily directly proportional. For example, even if the sound pressure level is the same between sounds of 100 Hz and 2000 Hz, the "loudness" perceived by humans differs by about 20 dB. For this reason, there is a frequency correction value called the A characteristic in order to correct the sensitivity difference between the actual sound pressure level and the "loudness" perceived by humans, and the correction value of the frequency weighting characteristic is specified in JIS C1509-1 as shown in Table 5 (see FIG. 18), for example. Thus, in an embodiment, the sound insulation property corresponding to the Dr-value, the indoor ambient sound, the alert threshold value (the maximum estimated sound pressure level for each frequency), the real-time sound pressure level and the like may be corrected by the correction value based on the A characteristic for the frequency band to be corrected, which is considered to be hard to hear in accordance with the sensitivity of human hearing. In this way, the sound pressure level is displayed at the sound pressure level after correction by A characteristic, so it is possible to alert the occurrence of sound leakage that matches the "loudness" actually perceived by humans over the entire frequency band.

Since the indoor ambient sound increases or decreases due to changes in the external environment of the building, as described above, it is not desirable to continue using the initially measured indoor ambient sound. Therefore, the user may periodically make the initial setup to measure the latest indoor ambient sound and update the corrected sound insulation property value after correction by frequency (second sound insulation property value by frequency), which is corrected by using the latest indoor ambient sound, in the storage device 12.

The external environment of the building also changes depending on time, for example, daytime and nighttime. Normally, during the daytime hours, since there are many people and traffic which generate a lot of noise, the indoor ambient sound becomes larger, so that the sound leakage is masked by the indoor ambient sound and less likely to occur. Also, the external environment of the building changes depending on the weather conditions, such as when there is no wind on a sunny day and when the noise of rain or wind is loud. In the latter weather condition, the indoor ambient sound becomes larger, so that the sound leakage is less likely to occur. Therefore, at the initial setup, the user should measure the indoor ambient sound under conditions in which the indoor ambient sound can be measured differently, for example, for each different time and for each different weather condition, and stores the indoor ambient sound measured under each different condition in the memory device 12 in association with the condition. Then, when the application is used, the time information and the weather information at that time are acquired, and the second sound insulation property value for each frequency is corrected using the indoor ambient sound stored in the storage device 12 corresponding to the acquired time and weather information (S7 in FIG. 10). Thereafter, the application screen after the completion of the initial setup in which the corrected sound insulation property value for each frequency is reset as the alert threshold value is displayed (S9 in FIG. 10). As a result, since the sound insulation property value for each frequency according to the time and the weather condition during the use of the application can be set as the alert threshold value, it is possible to accurately determine whether sound leakage occurs in the room. Further, the sound leakage suppression apparatus 1 can acquire the time information from a built-in clock and the weather information from the Internet.

Conventionally, it has been necessary to install various types of sensors on the walls, ceilings, floors, building frames, etc. of a building to measure the spatial sound pressure level difference, and to calculate the sound insulation property and the maximum sound pressure level that does not leak sound from the spatial sound pressure level difference values. On the other hand, in this application, the second sound insulation property value for each frequency set as the alert threshold value, that is, the maximum sound pressure level that does not leak sound, is estimated based on the building type, the structure, the building age, and the indoor ambient sound of the building. Therefore, many sensors that had to be attached to the building can be eliminated. Furthermore, the application can be used not only at home but also at facilities where the user is visiting such as hospitals, nursing homes, schools, offices, hotels, etc. to avoid noise trouble.

Some embodiments and examples have been described in this specification, but it is clear that various modifications and modifications thereto can be made without deviating from the broad spirit and scope of the present invention defined in the claim. That is, the present invention shall not be interpreted as limited by the details of the specific embodiments, examples, and the attached drawings.

The above-described embodiments can be realized by supplying one or more programs for executing the above-described functions and/or modules to a system or device via a network or a non-transitory computer readable medium, and executing the programs by one or more processors of the system or device.

What is claimed is:

1. A sound leakage suppression apparatus for suppressing sound produced in a room from leaking outside thereof, comprising:
   a microphone;
   a display; and
   a processor configured to:
      acquire information indicating sound insulation property of the room,
      based on the acquired information, determine a maximum volume level of sound that is permitted for each of a plurality of predetermined frequencies,
      control the microphone to collect sound produced in the room at a first time and determine a current volume level of the sound produced at the first time separately for each of the predetermined frequencies, and
      control the display to display both the maximum volume level and the current volume level for each of the predetermined frequencies.

2. The sound leakage suppression apparatus according to claim 1, wherein the processor is configured to:
   control the microphone to collect ambient sound in the room, and determine a volume level of the ambient sound for each of the predetermined frequencies, and
   modify the maximum volume level using the volume level of the ambient sound, for each of the predetermined frequencies.

3. The sound leakage suppression apparatus according to claim 2, wherein the processor is configured to add the volume level of the ambient sound to the maximum volume level, for each of the predetermined frequencies.

4. The sound leakage suppression apparatus according to claim 2, wherein the processor modifies the maximum volume level based on the volume level of the ambient sound when the ambient sound and the sound produced in the room at the first time are in a same time slot of a day.

5. The sound leakage suppression apparatus according to claim 2, wherein the processor modifies the maximum volume level based on the volume level of the ambient sound when the ambient sound and the sound produced in the room at the first time are collected under substantially the same weather conditions.

6. The sound leakage suppression apparatus according to claim 1, wherein the processor is configured to control the display to output an alert when the current volume level for any one of the predetermined frequencies exceeds the corresponding maximum volume level.

7. The sound leakage suppression apparatus according to claim 1, further comprising:
   a vibration motor, wherein
   the processor is configured to control the vibration motor to operate when the current volume level for any one of the predetermined frequencies exceeds the corresponding maximum volume level.

8. The sound leakage suppression apparatus according to claim 1, wherein the processor is configured to, when the current volume level for any one of the predetermined frequencies exceeds the corresponding maximum volume level, control the display to display a guidance message that guides a user on how to lower the volume level of sound at said one of the predetermined frequencies.

9. The sound leakage suppression apparatus according to claim 1, wherein the processor is configured to, when the current volume level for any one of the predetermined frequencies exceeds the corresponding maximum volume level, issue a signal that causes a sound source apparatus that is producing the sound to reduce a volume level of the sound at said one of the predetermined frequencies.

10. The sound leakage suppression apparatus according to claim 1, wherein the display shows a plurality of indicators corresponding to the predetermined frequencies and each indicating whether the current volume level for each one of the predetermined frequencies exceeds the corresponding maximum volume level.

11. A non-transitory computer readable medium storing a program causing a computer to execute a method for suppressing sound produced in a room from leaking outside thereof, the method comprising:
   acquiring information indicating sound insulation property of the room;
   based on the acquired information, determining a maximum volume level of sound that is permitted for each of a plurality of predetermined frequencies;
   collecting sound produced in the room at a first time and determining a current volume level of the sound produced at the first time separately for each of the predetermined frequencies; and
   displaying both the maximum volume level and the current volume level for each of the predetermined frequencies.

12. The computer readable medium according to claim 11, wherein the method further comprises:
   collecting ambient sound in the room, and determining a volume level of the ambient sound for each of the predetermined frequencies; and
   modifying the maximum volume level using the volume level of the ambient sound, for each of the predetermined frequencies.

13. The computer readable medium according to claim 12, wherein modifying the maximum volume level includes adding the volume level of the ambient sound to the maximum volume level, for each of the predetermined frequencies.

14. The computer readable medium according to claim 12, wherein the maximum volume level is modified based on the volume level of the ambient sound when the ambient sound and the sound produced in the room at the first time are in a same time slot of a day.

15. The computer readable medium according to claim 12, wherein the maximum volume level is modified based on the volume level of the ambient sound when the ambient sound and the sound produced in the room at the first time are collected under substantially the same weather conditions.

16. The computer readable medium according to claim 11, wherein the method further comprises:
   outputting an alert when the current volume level for any one of the predetermined frequencies exceeds the corresponding maximum volume level.

17. The computer readable medium according to claim 11, wherein the method further comprises:
   operating a vibration motor when the current volume level for any one of the predetermined frequencies exceeds the corresponding maximum volume level.

18. The computer readable medium according to claim 11, wherein the method further comprises:
   when the current volume level for any one of the predetermined frequencies exceeds the corresponding maximum volume level, displaying a guidance message that guides a user on how to lower the volume level of sound at said one of the predetermined frequencies.

19. The computer readable medium according to claim 11, wherein the method further comprises:
   when the current volume level for any one of the predetermined frequencies exceeds the corresponding maximum volume level, issuing a signal that causes a sound source apparatus that is producing the sound to reduce a volume level of the sound at said one of the predetermined frequencies.

20. A method carried out by a device for suppressing a sound produced in a room from leaking outside thereof, the method comprising:
   acquiring information indicating sound insulation property of the room;
   based on the acquired information, determining a maximum volume level of sound that is permitted for each of a plurality of predetermined frequencies;
   collecting sound produced in the room at a first time and determining a current volume level of the sound produced at the first time separately for each of the predetermined frequencies; and
   displaying both the maximum volume level and the current volume level for each of the predetermined frequencies.

* * * * *